(12) United States Patent
Lauw et al.

(10) Patent No.: US 6,986,572 B2
(45) Date of Patent: Jan. 17, 2006

(54) USE OF CATIONIC SURFACTANT TO IMPROVE PRINT QUALITY OF DYEBASED INKJET INKS

(75) Inventors: Hiang P Lauw, Corvallis, OR (US); John R Moffatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 150 days.

(21) Appl. No.: 10/208,996

(22) Filed: Jul. 30, 2002

(65) Prior Publication Data

US 2004/0021752 A1 Feb. 5, 2004

(51) Int. Cl.
*B41J 2/01* (2006.01)

(52) U.S. Cl. .................. 347/100; 347/95; 106/31.27
(58) Field of Classification Search ................. 347/100, 347/95, 96, 101; 106/31.27, 31.13, 31.6, 106/31.43, 31.25; 523/160, 161
See application file for complete search history.

(56) References Cited

U.S. PATENT DOCUMENTS

| | | | |
|---|---|---|---|
| 4,321,870 A | 3/1982 | Zasloff | |
| 4,723,129 A * | 2/1988 | Endo et al. | 347/63 |
| 5,108,501 A | 4/1992 | Moffatt | |
| 5,116,409 A | 5/1992 | Moffatt | |
| 5,129,948 A * | 7/1992 | Breton et al. | 106/31.43 |
| 5,133,803 A | 7/1992 | Moffatt | |
| 5,198,023 A | 3/1993 | Stoffel | |
| 5,531,817 A | 7/1996 | Shields et al. | |
| 5,788,753 A | 8/1998 | Pawlowski et al. | |
| 5,871,572 A | 2/1999 | Marritt | |
| 5,911,815 A | 6/1999 | Yamamoto et al. | |
| 5,976,231 A | 11/1999 | Schwarz | |
| 5,985,015 A | 11/1999 | Kanaya | |
| 6,001,899 A | 12/1999 | Gundlach et al. | |
| 6,153,001 A * | 11/2000 | Suzuki et al. | 106/31.65 |
| 6,177,485 B1 * | 1/2001 | Moffatt et al. | 523/160 |
| 6,342,095 B1 | 1/2002 | Takizawa et al. | |
| 6,652,639 B1 * | 11/2003 | Frenkel et al. | 106/31.89 |
| 2003/0130374 A1 * | 7/2003 | Smith et al. | 523/160 |

FOREIGN PATENT DOCUMENTS

| | | |
|---|---|---|
| EP | 0745651 | 12/1996 |
| EP | 0801118 A | 10/1997 |
| EP | 953 616 * | 11/1999 |
| EP | 09531616 A | 11/1999 |

* cited by examiner

*Primary Examiner*—Manish S. Shah

(57) ABSTRACT

The inks provide excellent ink-jet prints having excellent imaging onto the media with sharp, smooth edge text print and overall print quality improvements. The aqueous inks each comprise an anionic colorant (CMYK), a short chain alcohol or diol and a cationic surfactant.

20 Claims, No Drawings

USE OF CATIONIC SURFACTANT TO IMPROVE PRINT QUALITY OF DYEBASED INKJET INKS

FIELD OF THE INVENTION

The present invention generally relates to ink-jet printing, and in particular to a specific ink formulation for improved print quality on plain paper of a dye based ink, specifically with regard to edge raggedness/edge acuity.

BACKGROUND OF THE INVENTION

Ink-jet printing is a non-impact printing process in which droplets of ink are deposited on a print medium in a particular order to form alphanumeric characters, area-fills, and other patterns thereon. Low cost and high quality of the hardcopy output, combined with relatively noise-free operation, have made ink-jet printers a popular alternative to other types of printers used with computers. Notwithstanding their recent success, intensive research and development efforts continue toward improving ink-jet print quality. A surge in interest in ink-jet printing especially in the area of photographic printing has resulted in the need to produce high quality prints at a reasonable cost. The challenge remains to further improve the print quality of ink-jet prints. The emerging use of ink-jet prints for digital photos, requires high-resolution images that have accurate color, are durable, and do not show banding of colors. By this invention, it has been found that the addition of black increases the detail in the dark areas of images; therefore, for best results a black ink is needed.

For text quality on plain paper, pigmented blacks are preferred because dye based inks have a tendency to wick along the paper fibers which reduces the sharpness of the edges However, pigmented blacks and dye-based colors do not combine for good image quality on photo media. Improving edge sharpness/text quality of dye based black inks would enable one black for both plain paper text and imaging on photo media.

This invention also concerns a method to improve the edge sharpness of dye based black inks on plain paper using cationic surfactants.

Color ink-jet printers, such as a DesignJet® printer available from Hewlett-Packard Company, typically use three inks of differing hues: magenta, yellow, and cyan, and optionally black. The particular set of colorants, e.g., dyes, used to make the inks is called a "primary dye set." A spectrum of colors, e.g., secondary colors, can be generated using different combinations of the primary dye set.

In general, a successful ink set for color ink-jet printing must be compatible with the ink-jet pen and the printing system. Some of the required properties for the ink-jet ink include: good stability of the ink solution, the proper viscosity, the proper surface tension, no deleterious reaction with the printhead components, high solubility of the dyes in the vehicle, consumer safety and high color saturation. Another highly desirable performance of the inks is text with sharply defined characters, with minimal wicking, on photo as well as plain paper.

Inks are known which possess one or more of the foregoing properties. However, few inks are known that possess all the foregoing properties, since an improvement in one property often results in the degradation of another property. Thus, many inks used commercially represent a compromise in an attempt to achieve an ink evidencing at least an adequate response in each of the foregoing considerations. For example, inks are known which can obtain the color gamut comparable to silver halide prints, but, without software manipulation, cannot obtain the sharp, smooth edge appearance needed for crisp, un-blurred text printing. Accordingly, investigations continue into developing ink formulations which have improved properties and which do not improve one property at the expense of the others. Thus, there remains a need in the art to further improve the print quality and stability properties of the ink-jet prints without sacrificing pen performance and reliability and wherein the complexity of printer and software design is reduced.

SUMMARY OF THE INVENTION

In accordance with the invention, inks suitable for use in ink-jet inks and method for formulating the same are provided. It has been found that a synergy can be produced by the combination of certain anionic dyes, through the use of straight-chain cationic surfactants, and a short-chained alcohol or diol. This combination provides a basis for an ink formulation that provides for good print attributes, especially smooth, sharp edges for text quality on plain paper (bond, 100% cotton fiber, and copier paper), and good stability of the ink. The inks of the invention have better plain paper text quality because of improved edge sharpness.

The inks of this invention also have substantially higher viscosity (about 5 to about 8 cps) caused by the addition of the cationic surfactant.

Alcohols and straight-chain alkane diols have often been added to ink vehicles as humectants to reduce crusting in inks. However, humectants alone often increase line width and promote wicking of the resultant ink. Surprisingly, the synergy present between the selected alcohols or alkane diols and the cationic surfactant results in a very stable formulation that allows the formulator to combine anionic colorants with the cationic surfactant without precipitation or "crashing" of the colorant out of solution. In the past, it has been common to use an anionic ink and a cationic ink or other solution to control bleed. In those situations, when the two fluids come into contact on the print substrate, the anionic colorant would precipitate, thereby immobilizing the colorant onto the print surface. It has now been found that a stable, solution can be formulated containing both the anion and cation without triggering precipitation of the colorant. Moreover, without limitation to theory, it is believed the addition of the cationic surfactant to the anionic colorant increases the viscosity of the ink, which delays dot spread resulting in a sharper edge. This formulation works well on any typical paper media.

In the practice of this invention, dye based aqueous inks each comprise from about 0.1 to about 20 wt % of at least one anionic dye in the color ink formulations, from about 1 to about 30wt % of at least one short chain alcohol or diol, and from about 0.5 to about 6 wt % of at least one cationic surfactant. Additionally other independently selected ingredients can be added including those from the group consisting of buffers, biocides, and metal chelators; and the balance water.

The invention applies particularly to edge sharpness in text and as such is of particular interest for dye based BLACK inks. Edge sharpness in colored text is currently not considered as critical although this method works with cyan, magenta and yellow dyes, and any other dyes as well.

DETAILED DESCRIPTION OF THE INVENTION

While the specification concludes with claims particularly pointing out and distinctly claiming that which is regarded as the present invention, the advantages of this invention can be more readily ascertained from the following description of the invention.

All concentrations herein are in weight percent of total ink composition unless otherwise indicated. The purity of all components is that employed in normal commercial practice for ink-jet inks.

A person skilled in the art will recognize that additional embodiments not particularly disclosed herein are also within the scope of this invention as claimed.

Colorants

In the practice of this invention, dye based aqueous inks each comprise from about 0.1 to about 20 wt % of at least one anionic dye in the color ink formulations.

Dyes—Dyes, whether water-soluble or water-insoluble, may be employed in the practice of the present invention. Examples of water-soluble dyes include the sulfonate and carboxylate dyes, specifically, those that are commonly employed in ink-jet printing. Specific examples include: DirectBlack 168, K1334, Sulforhodamine B (sulfonate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate, all available from Aldrich Chemical Company. Examples of water-insoluble dyes include azo, xanthene, methine, polymethine, and anthroquinone dyes. Specific examples of water-insoluble dyes include Ciba-Geigy Orasol Blue GN, Ciba-Geigy Orasol Pink, and Ciba-Geigy Orasol Yellow. Any dye available and compatible with the other formulated ingredients of this invention may be used as colorants.

Vehicle

The inks of the present invention comprise an aqueous vehicle comprising the following components (in wt % of total ink composition): from about 1 to about 30, preferably from about 5 to about 20, wt % of at least one short chain alcohol or diol. Preferably the alcohol or diol has a carbon chain of about 7 or less. A preferred alcohol useful herein includes 3-pyridylcarbinol. Additionally, a preferred solvent useful herein includes 2-pyrrolidinone. The cationic surfactant of the invention is present in an amount of from about 0.5 to about 6, preferably from about 1 to about 5 wt % of the ink formula. Because of solubility limitations, the more preferred cationic surfactants has a head group of from about 8 to 18 carbons. Additionally other independently selected ingredients can be added, each in an amount ranging of up to 3% (from 0 to about 3%) by wt, including those from the group consisting of buffers, biocides, and metal chelators; and the balance water.

Alcohol: Any straight or branched chain mono- or diol of less than 7 carbon chain, preferably from about 3 to about 7 carbons, can be used. Two preferred alcohol/diol solvents for use herein are isopropyl alcohol and non-branched glycol ether.

Cationic Surfactants—Although any cationic surfactant with a headgroup of from about 8 to 18 carbons can be used herein, the preferable surfactant has the structure:

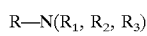

Wherein R can be from about 8 to 18 carbons, $R_1, R_2, R_3$ can be from 1 to 4 carbon atoms, in any combination thereof Buffer: The inks of the present invention optionally comprise 0 to about 3 wt % buffer. More preferably, the inks comprise from about 0.1 to about 0.5 wt % buffer, with a concentration from about 0.1 to about 0.3 wt % being the most preferred.

Buffers employed in the practice of the invention to modulate pH can be organic-based biological buffers or inorganic buffers, preferably, organic-based. Further, the buffers employed should maintain a pH ranging from about 3 to about 9 in the practice of the invention, preferably about 6.5 to about 8 and most preferably from about 7.2 to 7.8. Examples of preferably-employed buffers include Trizma Base, available from companies such as Aldrich Chemical (Milwaukee, Wis.), 4-morpholineethanesulfonic acid (MES), b-hydroxy-4-morpholinepropanesulfonic acid (MOPSO), and 4-morpholinepropanesulfonic acid (MOPS). Most preferably, Trizma base is employed in the practice of the invention.

Metal Chelator: The inks of the present invention optionally comprise 0 to about 3 wt % metal chelator. More preferably, the inks comprise from about 0.1 to about 0.5 wt % metal chelator, with a concentration from about 0.1 to about 0.3 wt % being the most preferred.

Metal chelators employed are used to bind metal ions that may be present in the ink. Examples of preferably-employed metal chelators include: Ethylenediaminetetraacetic acid (EDTA), Diethylenetriaminepentaacetic acid (DTPA), trans-1,2-diaminocyclohexanetetraacetic acid (CDTA), (ethylenedioxy) diethylenedinitrilotetraacetic acid (EGTA), or other chelators that can bind metal cations. More preferably, EDTA, and DTPA; and most preferably EDTA in its disodium salt form is employed in the practice of the invention.

Biocide: The inks of the present invention optionally comprise 0 to about 3 wt % biocide. More preferably, the inks comprise from about 0.1 to about 0.5 wt % biocide, with a concentration from about 0.1 to about 0.3 wt % being the most preferred.

Any of the biocides commonly employed in ink-jet inks may be employed in the practice of the invention, such as Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250. Proxel GXL is the preferred biocide. The specific ink set disclosed herein is expected to find commercial use in ink-jet color printing.

EXAMPLES

Inks are formulated and different properties of the formulated inks are measured in an effort to assess the benefits attained in the practice of the invention, namely, effect of viscosity and edge sharpness.

TABLE I

Ink Formulation.

| Component | 1 | 2 | 3 | 4 | 5 | 6 |
|---|---|---|---|---|---|---|
| EDTA, Na salt | 0.1 wt % | 0.1 wt % | 0.1 wt % | 0.1 wt % | 0.1 wt % | 0.1 wt % |
| Biocide | 0.15 wt % | 0.15 wt % | 0.15 wt % | 0.15 wt % | 0.15 wt % | 0.15 wt % |
| Surfactant Cationic | 0.48 wt % | 0.5 wt % | 1.0 wt % | 0.56 wt % | 2.0 wt % | 5.00 wt % |
| 1,6 hexanediol | 4 wt % | 15 wt % | 24 wt % | | | |
| Isopropyl alcohol | | | | 1 wt % | 20 wt % | 28 wt % |
| 2-pyrrolidone | 4 wt % | 4 wt % | 4 wt % | 4 wt % | 4 wt % | 4 wt % |
| MOPS | 0.05 wt % | 0.05 wt % | 0.05 wt % | 0.05 wt % | 0.05 wt % | 0.05 wt % |
| 3-pyridylcarbinol | | 8 wt % | | | | 8 wt % |
| DDI Water | Balance | Balance | Balance | Balance | Balance | Balance |
| Total | 100 wt % | 100 wt % | 100 wt % | 100 wt % | 100 wt % | 100 wt % |

Notes:
EDTA is ethylene diamine tetraacetate.
DDI water is distilled deionized water.
pH adjusted with KOH for the vehicle to 7.2 to 7.3.
MOPS is 4-morpholinepropanesulfonic acid.
A variety of cationic surfactants with head groups of from 8 to 18 are used.

What is claimed is:

1. An inkjet ink comprising an anionic black dye colorant, a straight-chain cationic surfactant, and a component selected from the group consisting of short-chain alcohol, diols, and combinations thereof, and wherein said ink has a viscosity of between about 5 and about 8 cps.

2. An inkjet ink according to claim 1 wherein said anionic colorant is present in an amount of from about 0.1% to about 20% by wt of composition.

3. An inkjet ink according to claim 1 wherein said cationic surfactant is present in an amount of from about 0.5% to about 6% by wt of composition.

4. An inkjet ink according to claim 1 wherein said short chain alcohol or diol is present in an amount of from about 1% to about 30% by wt of composition.

5. An inkjet ink according to claim 1 wherein said ink additionally comprises ingredients selected from the group consisting of buffers, biocides, metal chelators, water, and mixtures thereof.

6. An inkjet ink according to claim 1 additionally comprising 2-pyrrolidone.

7. An inkjet ink according to claim 1 wherein said short chain contains about 7 or less carbons.

8. An inkjet ink according to claim 1 wherein said short chain is selected from the group consisting of isopropyl alcohol, non-branched glycol ether, and mixtures thereof.

9. An inkjet ink according to claim 1 wherein said cationic surfactant contains a head group of from about 8 to 18 carbons.

10. An inkjet ink according to claim 9 wherein said cationic surfactant is of the structure:

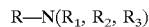

wherein R can be from about 8 to about 18 carbons, $R_1$, $R_2$, $R_3$ can be from about 1 to about 4 carbon atoms.

11. A method of providing text prints with sharp, smooth edges comprises printing with inks which comprise an anionic black dye colorant, a straight-chain cationic surfactant, and a component selected from the group consisting of short-chain alcohol, diols, and combinations thereof, and wherein said ink has a viscosity of between about 5 and about 8 cps.

12. A method according to claim 11 wherein said anionic colorant is present in an amount of from about 0.1% to about 20% by wt of composition.

13. A method according to claim 11 wherein said cationic surfactant is present in an amount of from about 0.5% to about 6% by wt of composition.

14. A method according to claim 11 wherein said short chain alcohol or diol is present in an amount of from about 1% to about 30% by wt of composition.

15. A method according to claim 11 wherein said ink additionally comprises ingredients selected from the group consisting of buffers, biocides, metal chelators, water, and mixtures thereof.

16. A method according to claim 11 additionally comprising solvents selected from the group consisting of include 3-pyridylcarbinol, 2-pyrrolidone, and mixtures thereof.

17. A method according to claim 11 wherein said short chain contains about 7 or less carbons.

18. A method according to claim 11 wherein said short chain is selected from the group consisting of isopropyl alcohol, non-branched glycol ether, and mixtures thereof.

19. A method according to claim 11 wherein said cationic surfactant contains a head group of from about 8 to 18 carbons.

20. A method according to claim 19 wherein said cationic surfactant is of the structure:

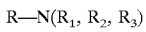

wherein R can be from about 8 to about 18 carbons, $R_1$, $R_2$, $R_3$ can be from about 1 to about 4 carbon atoms.

* * * * *